(12) United States Patent
Rusek (10) Patent No.: US 7,344,799 B2
(45) Date of Patent: Mar. 18, 2008

(54) DIRECT HYDROGEN PEROXIDE FUEL CELL

(75) Inventor: John Rusek, West Lafayette, IN (US)

(73) Assignee: Swift Enterprises, Ltd., West Lafayette, IN (US)

( * ) Notice: Subject to any disclaimer, the term of this patent is extended or adjusted under 35 U.S.C. 154(b) by 359 days.

(21) Appl. No.: 11/074,536

(22) Filed: Mar. 8, 2005

(65) Prior Publication Data

US 2005/0175878 A1    Aug. 11, 2005

Related U.S. Application Data

(63) Continuation-in-part of application No. 10/269,046, filed on Oct. 11, 2002, now abandoned.

(51) Int. Cl.
*H01M 4/00* (2006.01)
*H01M 8/10* (2006.01)
*H01M 2/00* (2006.01)

(52) U.S. Cl. .............................. 429/43; 429/33; 429/34

(58) Field of Classification Search .................. 429/30, 429/33, 42, 43, 34
See application file for complete search history.

(56) References Cited

U.S. PATENT DOCUMENTS

| | | | | |
|---|---|---|---|---|
| 3,410,727 A * | 11/1968 | Jasinski | ........................ | 429/43 |
| 3,758,339 A * | 9/1973 | Manion | ........................ | 429/13 |
| 4,340,448 A * | 7/1982 | Schiller et al. | ............. | 205/778 |
| 5,716,437 A * | 2/1998 | Denton et al. | ........... | 106/31.92 |
| 6,485,851 B1 * | 11/2002 | Narayanan et al. | ........... | 429/17 |

* cited by examiner

*Primary Examiner*—Patrick Joseph Ryan
*Assistant Examiner*—Thomas H. Parsons
(74) *Attorney, Agent, or Firm*—Townsend & Banta (57) ABSTRACT

A direct hydrogen peroxide fuel cell for stable and efficient production of electric current by direct reduction of hydrogen peroxide via a cathode comprising a metal phthalocyanine electrocatalyst, coupled with oxidation of fuel by means of ion transfer across an ion-conducting polymer electrolyte, is provided. In addition, a hydrogen peroxide concentration meter is provided, which may be utilized, for example, for measuring the concentration of hydrogen peroxide in solutions that may contain strong electrolytes or in automated systems such as those to be used with the present fuel cell.

7 Claims, 10 Drawing Sheets

Membrane Electrode Ass'ly Detail

FIG. 10

DIRECT HYDROGEN PEROXIDE FUEL CELL

The present application is a continuation-in-part application of parent application Ser. No. 10/269,046, filed Oct. 11, 2002, now abandoned, the contents of which are incorporated herein by reference.

FIELD OF THE INVENTION

The present invention concerns a direct hydrogen peroxide fuel cell which utilizes a proton-donating fuel. In particular, a direct hydrogen peroxide/proton-donating-fuel fuel cell is provided for production of electric current by reduction of liquid hydrogen peroxide coupled with oxidation of liquid fuel by means of direct contact of same with a cathode coated with an electrocatalyst and an anode coated with an electrocatalyst, respectively, resulting in ion transfer across an ion-conducting polymer electrolyte without significant denaturing or decomposition of the electrocatalyst.

BACKGROUND OF THE INVENTION

In conventional fuel cells containing hydrogen peroxide as the oxidizing agent, a metal anode is oxidized along with reduction of the hydrogen peroxide solution, causing an electric current to flow from the anode to the cathode through the electrolyte, which is contained within the hydrogen peroxide solution. An alternate method for utilization of hydrogen peroxide involves the decomposition of hydrogen peroxide to water and oxygen, wherein oxygen then acts as an oxidant in conventional fuel/oxygen fuel cells, such as the popular hydrogen/oxygen fuel cell; this method can be referred to as indirect hydrogen peroxide reduction.

However, in conventional liquid fuel cells containing $H_2O_2$, the aluminum anode oxidizes to aluminum oxides during reduction of the $H_2O_2$, resulting in significant deterioration of the fuel cell's performance over time due to poisoning of the metal surface of the anode. Moreover, selection of the cathode material is difficult, as only certain cathode materials will effectively reduce $H_2O_2$ at a desirable rate, i.e., at a rate of reduction which will produce sufficient current, but without undue $H_2O_2$ decomposition. Additionally, the direct reduction of hydrogen peroxide to water on the cathode surface is the rate-limiting reaction in the production of electricity from hydrogen peroxide, and thus a catalyst is required to achieve sufficient power density. Utilization of noble metal catalysts in this manner facilitates hydrogen peroxide decomposition, releasing oxygen as waste, and thus a decrease in cell efficiency.

Conventionally, noble metals, such as palladium and platinum, have been used as catalysts. Palladium and platinum, like all noble metals, however, are catalysts, not electrocatalysts, and as such will decompose to oxygen rapidly when placed in contact with hydrogen peroxide. This decomposition generates a great amount of heat, resulting in a large loss of efficiency, and thus requiring significantly more hydrogen peroxide to flow through the system than would be otherwise needed, to compensate for the energy lost through heat.

For example, as disclosed in prior U.S. Pat. No. 6,554,877, fuel cells using methanol as a liquid fuel, with a cathode made using screen-printing methods of 20% platinum on activated carbon on waterproof paper, have been used. However, as noted therein, catalyst poisoning or cathode sintering is encountered.

In prior U.S. Pat. No. 6,294,281, a fuel cell is disclosed having an anode and a cathode comprised of an enzyme, such as a dehydrogenase, organic compounds or organometallic molecules, which operate using fuels from biological systems. The '281 fuel cell, for example, is implanted into a portion of an animal or plant, and utilizes biological fluid, such as blood or sap, as the fuel, or may utilize tissue or cellulose outside of the biological organism. The '281 fuel cell is capable of reducing hydrogen peroxide at the cathode, but must first form the hydrogen peroxide in a non-enzyme-catalyzed electrode reaction or in an enzyme-catalyzed reaction on or off the cathode. Thus, the '281 fuel cell necessitates additional steps in the power generation process, and cannot be manufactured in an extremely compact design.

In view of the deficiencies of the above-mentioned conventional direct hydrogen peroxide and liquid fuel cells, it is an object of the present invention to provide a direct hydrogen peroxide fuel cell having an electrocatalyst not susceptible to catalyst poisoning or sintering, or side reactions with the oxidant. It is a further object of the present invention to provide a direct hydrogen peroxide fuel cell capable of stable power generation over time, i.e., which does not experience degradation over time. It is yet a further object of the present invention to provide a direct hydrogen peroxide fuel cell capable of being manufactured in a compact design, and which can run on liquid fuel and oxidant.

SUMMARY OF THE INVENTION

The inventors of the present invention have earnestly conducted extensive research in order to achieve the objects of the present invention discussed above, and as such have discovered a novel direct hydrogen peroxide fuel cell cathode which provides closer to the thermodynamically expected efficiency of hydrogen peroxide. Reduction of hydrogen peroxide is carried out in a separate compartment, the anode and cathode comprise electrocatalysts, and ion transfer occurs through a polymer membrane electrolyte. Several embodiments of such direct methanol-direct hydrogen fuel cell of the present invention are provided as follows:

In a first embodiment of the present invention, a direct hydrogen peroxide fuel cell utilizing proton-donating fuel is provided, comprising:

a first compartment having a first end with at least one input orifice and at least one output orifice disposed therein, and a second open end;

an anode disposed adjacent and in contact with the second open end of the first compartment, said anode coated with an electrocatalyst;

a proton-conducting membrane disposed adjacent to and in contact with the anode;

a cathode disposed adjacent to and in contact with the ion conducting membrane and in electrically connection with the anode, said cathode coated with a transition metal bio-mimic electrocatalyst, said electrocatalyst being reactive with hydrogen peroxide in an electrochemical system under current flow, and unreactive with hydrogen peroxide under direct contact conditions without current flow; and a second compartment having a first end with at least one input orifice and at least one output orifice disposed therein, and a second open end disposed adjacent to and in contact with the cathode.

In a second embodiment of the present invention, the direct hydrogen peroxide fuel cell according to the first embodiment above is provided, the first compartment additionally contains a proton-donating liquid fuel.

In a third embodiment of the present invention, the direct hydrogen peroxide fuel cell according to the first embodiment above is provided, wherein the anode is comprised of a porous and electrically conductive substrate.

In a fourth embodiment of the present invention, the direct hydrogen peroxide fuel cell according to the third embodiment above is provided, wherein the anode further has an ion-conducting polymer impregnated therein.

In a fifth embodiment of the present invention, the direct hydrogen peroxide fuel cell according the first embodiment above is provided, wherein the ion conducting membrane is a perfluorinated polymer containing sulfonic or carboxylic ionic functional groups.

In a sixth embodiment of the present invention, the direct hydrogen peroxide fuel cell according to the first embodiment above is provided, wherein the cathode, anode, or both, further comprises a metal selected from the group consisting of ruthenium, rhodium, palladium, osmium, iridium and platinum, or a mixture thereof, to assist in catalyzing the reduction of hydrogen peroxide or the oxidation of fuel, respectively.

In a seventh embodiment of the present invention, the direct hydrogen peroxide fuel cell according to the sixth embodiment described above is provided, wherein the cathode further comprises a conductive and porous substrate (for example, fritted or woven carbon and metallic species).

In an eighth embodiment of the present invention, the direct hydrogen peroxide fuel cell according to the seventh embodiment above is provided, wherein the cathode further comprises a conductive binder.

In a ninth embodiment of the present invention, the direct hydrogen peroxide fuel cell according to the eighth embodiment above is provided, wherein the binder is a porous, inert, and ion-conductive polymer.

In a tenth embodiment of the present invention, the direct hydrogen peroxide fuel cell according to the first embodiment described above is provided, wherein the electrocatalyst is a transition metal phthalocyanine.

In an eleventh embodiment of the present invention, the direct hydrogen peroxide fuel cell according to the first embodiment above is provided, wherein the cathode further comprises a substrate attached to the electrocatalyst.

In a twelfth embodiment of the present invention, the direct hydrogen peroxide fuel cell according to the tenth embodiment above is provided, wherein the cathode further comprises a substrate attached to the electrocatalyst.

In an thirteenth embodiment of the present invention, the direct hydrogen peroxide fuel cell according to the first embodiment above is provided, wherein the fuel cell further contains a proton donor liquid reservoir flowably connected to the input orifice of the first compartment, for holding and supplying a proton donor liquid to the fuel cell via the input orifice.

In a fourteenth embodiment of the present invention, the direct hydrogen peroxide fuel cell according to the first embodiment above is provided, wherein the fuel cell further contains a proton acceptor liquid reservoir flowably connected to the input orifice of the second compartment, for holding and supplying a proton acceptor liquid to the fuel cell via the input orifice.

In a fifteenth embodiment of the present invention, the direct hydrogen peroxide fuel cell according to the fourteenth embodiment above is provided, wherein the proton acceptor liquid contains hydrogen peroxide.

In a sixteenth embodiment of the present invention, the direct hydrogen peroxide fuel cell according to the first embodiment above is provided, wherein the fuel cell further contains a receiving reservoir flowably connected to the output orifice of the first compartment.

In a seventeenth embodiment of the present invention, the direct hydrogen peroxide fuel cell according to the first embodiment above is provided, wherein the fuel cell further contains a receiving reservoir flowably connected to the output orifice of the second compartment.

In an eighteenth embodiment of the present invention, the direct hydrogen peroxide fuel cell according to the fifteenth embodiment of the present invention is provided, wherein the proton acceptor liquid reservoir comprises a hydrogen peroxide concentration sensor.

In a nineteenth embodiment of the present invention, the direct hydrogen peroxide fuel cell according to the second embodiment above is provided, wherein the proton-donating fuel is comprised of water saturated hydrogen, methanol in water, sodium borohydride in water, hydroxylamine in water, and their analogues and combinations.

In a twentieth embodiment of the present invention, the direct hydrogen peroxide fuel cell according to the second embodiment above is provided, wherein the second compartment additionally contains hydrogen peroxide and water.

In a twenty first embodiment of the present invention, the direct hydrogen peroxide fuel cell according to the third embodiment above is provided, wherein the porous and electrically conductive substrate is selected from fritted carbon, carbon cloth, fritted metals or woven metals.

In a twenty second embodiment of the present invention, the direct hydrogen peroxide fuel cell according to the eighth embodiment above is provided, wherein the conductive binder is comprised of a substituted synthetic zeolite, or a conducting polymer.

DETAILED DESCRIPTION OF THE INVENTION

Many conventional fuel cells using hydrogen peroxide are designed so that hydrogen peroxide comes into direct contact with the anode material, and reduces the anode material (usually a metal). Consequently, the liquid hydrogen peroxide constitutes an electrolytic species, and ions are conducted through the electrolyte to the cathode, the site of hydrogen peroxide reduction. Such conventional liquid fuel cells, containing hydrogen peroxide, have an anode and a cathode immersed in a diluted hydrogen peroxide solution.

Generally, the anode is made of a metal such as aluminum, which oxidizes to form aluminum oxides, and hydrogen peroxide ($H_2O_2$) is reduced. However, as both the anode and the cathode are exposed to the hydrogen peroxide, excessive decomposition of the hydrogen peroxide occurs, and the anode quickly oxidizes through chemical reaction with hydrogen peroxide or its ions (as opposed to the electrochemical reaction), causing a decrease in performance relatively quickly over time. Further, difficulties arise in that only certain cathodes will reduce hydrogen peroxide in this environment, and satisfactory current production is difficult.

Figure 1:
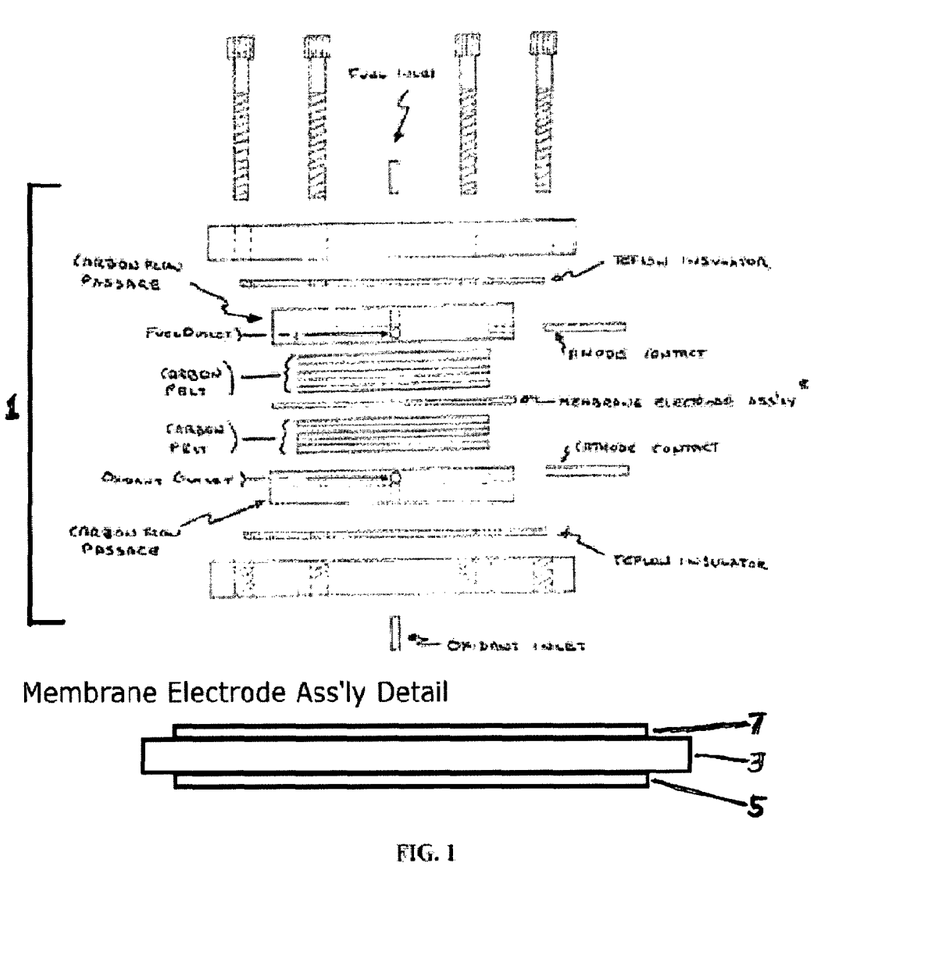
FIG. 1 is a cross sectional view of the direct hydrogen peroxide fuel cell of the present invention.

In contrast, the present invention provides a fuel cell 1, as shown in FIG. 1, wherein an electrolyte membrane 3 separates the proton donor (fuel) from the proton acceptor (hydrogen peroxide), resulting in the reduction of hydrogen peroxide at the cathode 5 and oxidation of the fuel at the anode 7. Further, the cathode 5 of the present invention comprises a metal phthalocyanine electrocatalyst that will not heterogeneously decompose hydrogen peroxide, and will catalyze the reduction of hydrogen peroxide only under current flow.

The anode 7 may be formed of a porous conductive substrate, with a polymer impregnated therein, or coated thereon. Suitable polymers are, for example, perfluorinated polymers containing sulfonic or carboxylic ionic functional groups which allow the transfer of protons there through, such as NAFION. In addition, a polymer such as TEFLON may be impregnated therein or coated thereon to provide hydrophobicity to the anode 7, for compatibility with nonpolar fuels. Alternatively, the anode 7 may be formed of dehydrogenases, substances that have similar structure-function relationships to dehydrogenases, or synthetic dehydrogenase-like enzymes, or be comprised of catalysts such as platinum, ruthenium, and palladium, or a mixture thereof.

As mentioned above, the hydrogen-peroxide reduction cathode 5 is comprised of a metallic phthalocyanine such as, for example, iron phthalocyanine, cobalt phthalocyanine, manganese phthalocyanine and copper phthalocyanine. As illustrated in FIGS. 3-8, it was unexpectedly discovered that coating the cathode 5 with a metallic phthalocyanine, or forming the cathode partially or wholly of a metal phthalocyanine, provides a direct hydrogen peroxide fuel cell capable of efficient direct reduction of liquid hydrogen peroxide over time, minimal heat generation, stable voltage, while avoiding catalyst poisoning and/or sintering problems associated with conventional direct liquid hydrogen peroxide fuel cells.

In addition, as illustrated in FIG. 1, the cathode 5 may include carbon paper, or a suitable conductive substrate, with porosity preferable to achieve sufficient surface area. An ion-conducting membrane 3 is placed between the anode 7 and the cathode 5, and the anode 7 and cathode 5 pressed against the proton conducting membrane 3 to form an anode/cathode membrane which effectively divides the fuel cell 1 into separate compartments.

Figure 2:
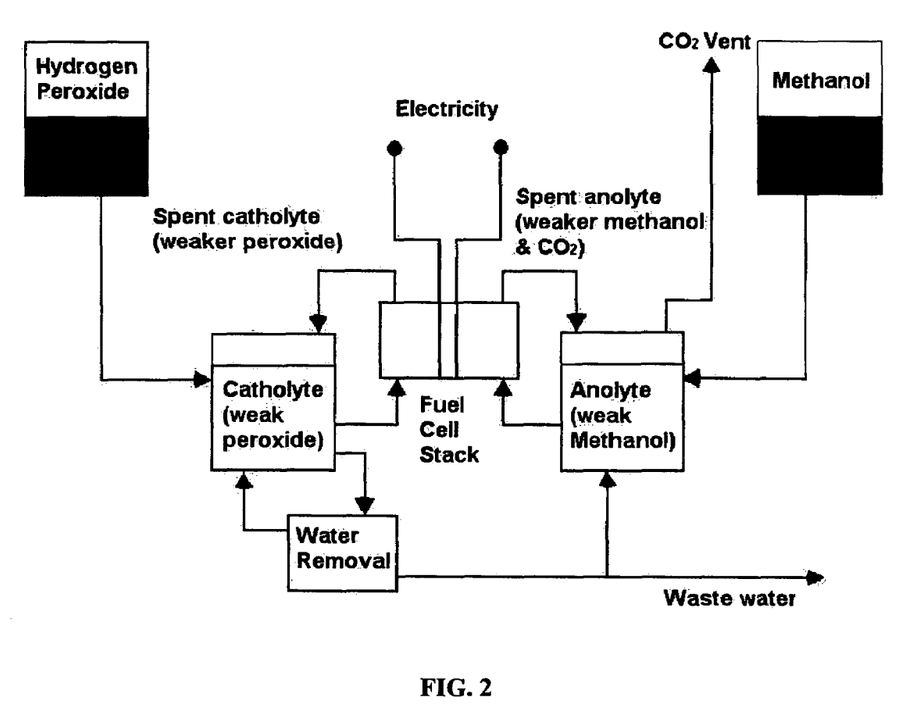
FIG. 2 is a block diagram of the fuel cell of the present invention.

The block diagram shown in FIG. 2 illustrates the operation of fuel cell 1. Specifically, hydrogen peroxide and water (as the oxidant) are added to the cathode side of the fuel cell 1, and a fuel is added to the anode side of the fuel cell 1, to produce electric current by the flow of protons, i.e., proton transfer, over the anode/cathode membrane. Fuel and hydrogen peroxide solutions must be added periodically to each of the anode and the cathode sides of the fuel cell 1, respectively, usually by an automatic computer controlled system. Importantly, the concentrations of each of the solutions must be within a predetermined range, in order to achieve satisfactory operation of the fuel cell. Therefore, the concentration of the solutions must be monitored and adjusted before injection thereof into the fuel cells. The liquid fuel, dissolved in basic solution, may be methanol, sodium borohydride, hydroxylamine and the like. Preferred concentrations of the fuel component are 0.001M to 10M, and the most preferred concentrations are 0.01 to 5M in a basic solution whose concentration is $\frac{1}{10}$ that of the fuel. For example, 0.1M sodium borohydride in 0.01M sodium hydroxide or 1M methanol in 0.1M sodium hydroxide. The hydrogen peroxide concentration is made to be stoichiometric with the fuel concentration. For example, 4M hydrogen peroxide with 1M sodium borohydride, or, 0.3M hydrogen peroxide with 0.1M methanol. Preferred concentrations are +/−50% of stoichiometric; most preferred are +/−10% of stoichiometric.

Figure 3:
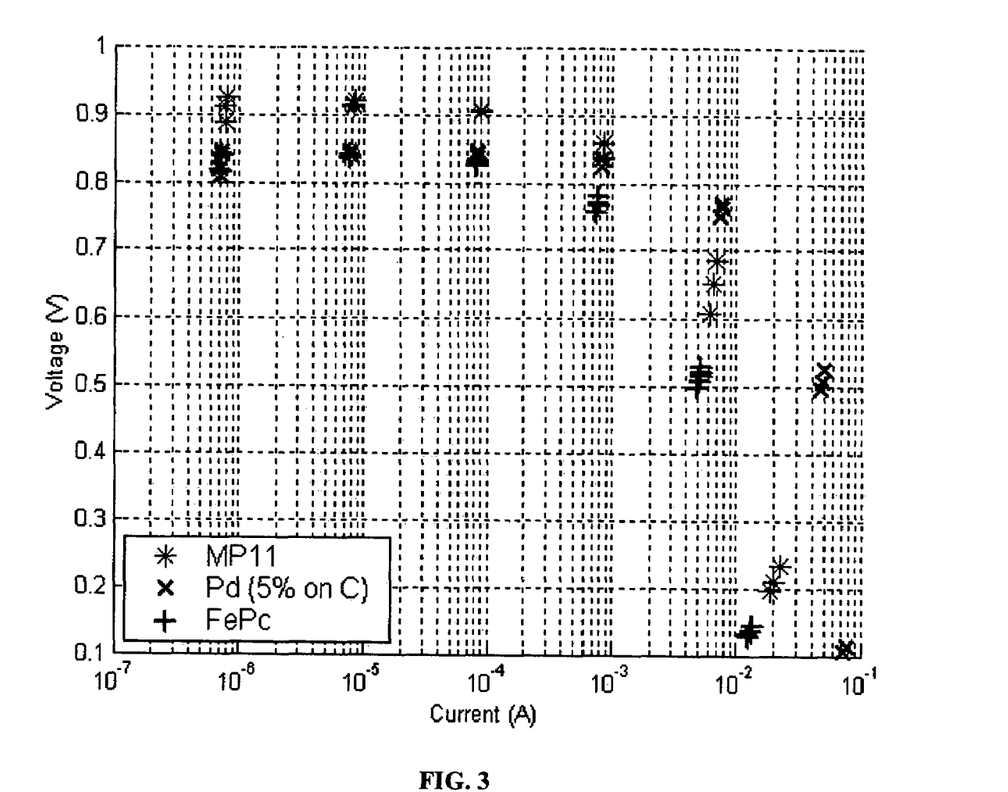
FIG. 3 is a polarization curve illustrating voltage versus current for three 1 cm$^2$ fuel cells, the fuel cells having a conventional microperoxidase-11 cathode catalyst, a conventional palladium cathode catalyst, and an iron phthalocyanine cathode electrocatalyst of the present invention, respectively. Fuel is water saturated hydrogen; oxidant is 3M hydrogen peroxide. Flow rate for both streams is 1 ml/min (STP for hydrogen).
Figure 4:
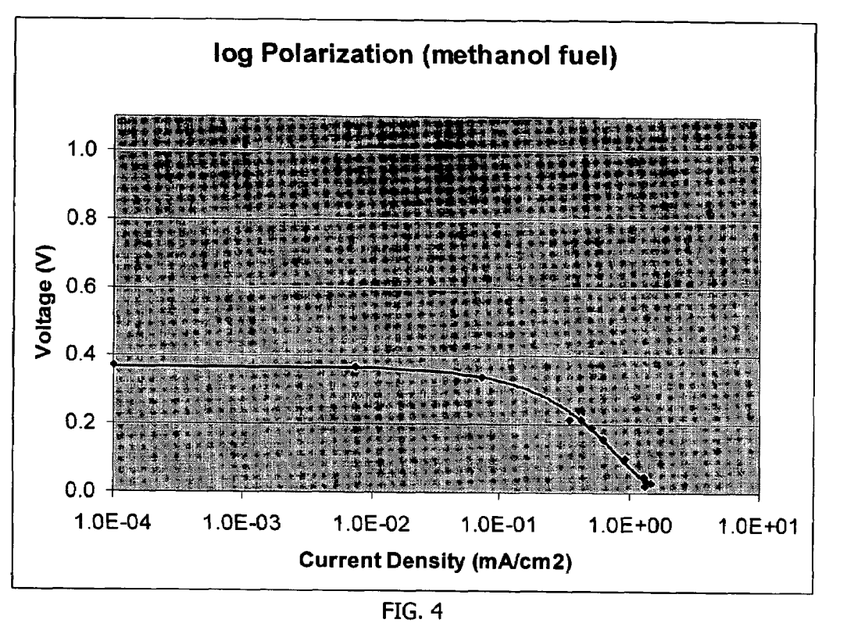
FIG. 4 is a polarization curve for a 50 cm$^2$ area fuel cell of the present invention having an iron phthalocyanine cathode electrocatalyst, illustrating voltage versus log of the current density when running 1M methanol in 0.1M sodium hydroxide as the fuel, and 3M hydrogen peroxide as the oxidant, with a flow rate for each stream of 8 ml/min.
Figure 5:
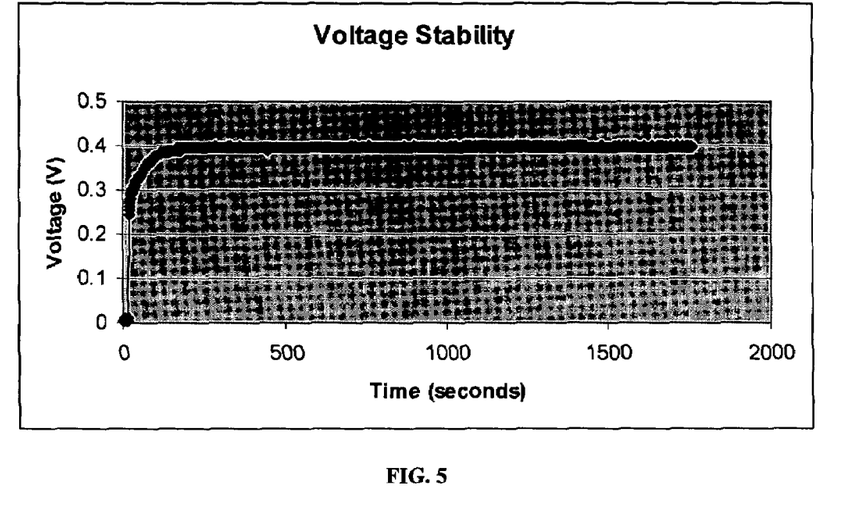
FIG. 5 is a graph illustrating the stability of voltage over time for a 50 cm$^2$ area fuel cell of the present invention having an iron phthalocyanine cathode electrocatalyst, when running 1M methanol in 0.1M sodium hydroxide as the fuel, and 3M hydrogen peroxide as the oxidant, with a flow rate for each stream of 8 ml/min.
Figure 6:
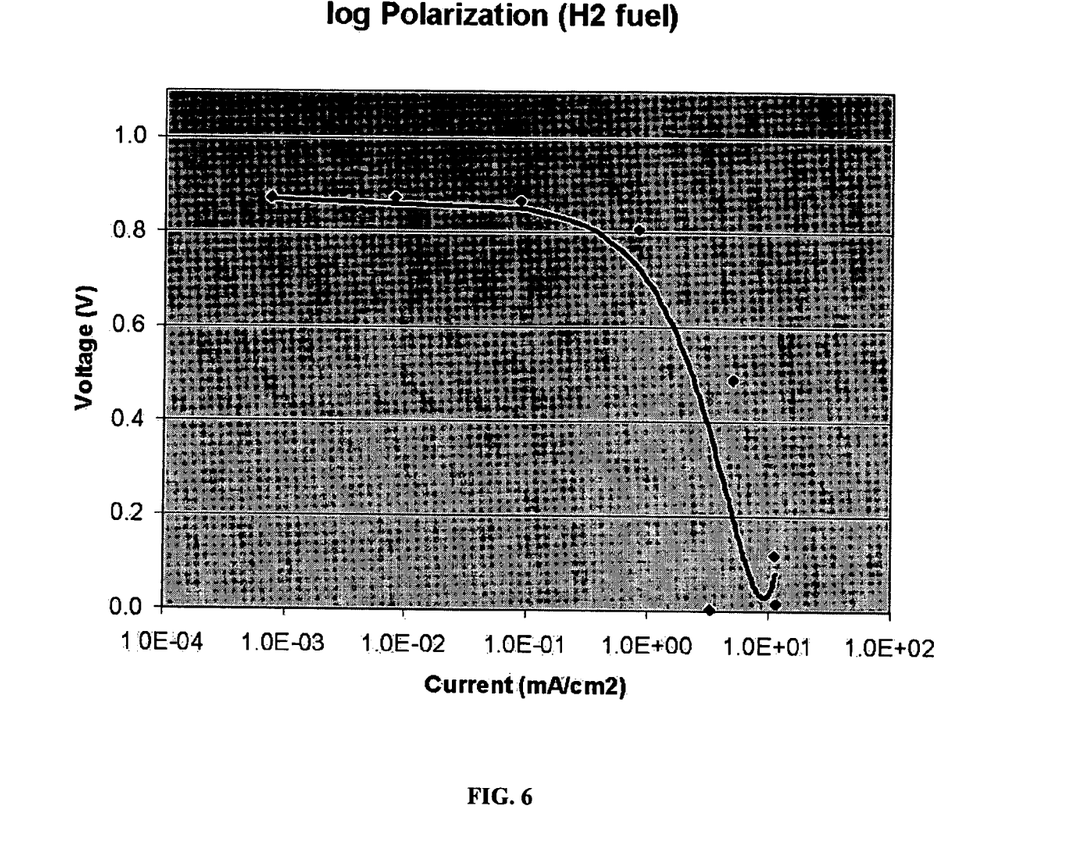
FIG. 6 is a fitted polarization curve for a 1 cm$^2$ area fuel cell of the present invention having an iron phthalocyanine cathode electrocatalyst, when running water saturated hydrogen as the fuel, and 3M hydrogen peroxide as the oxidant, with a flow rate for each stream of 1 ml/min (STP (standard temperature and pressure) for hydrogen).
Figure 7:
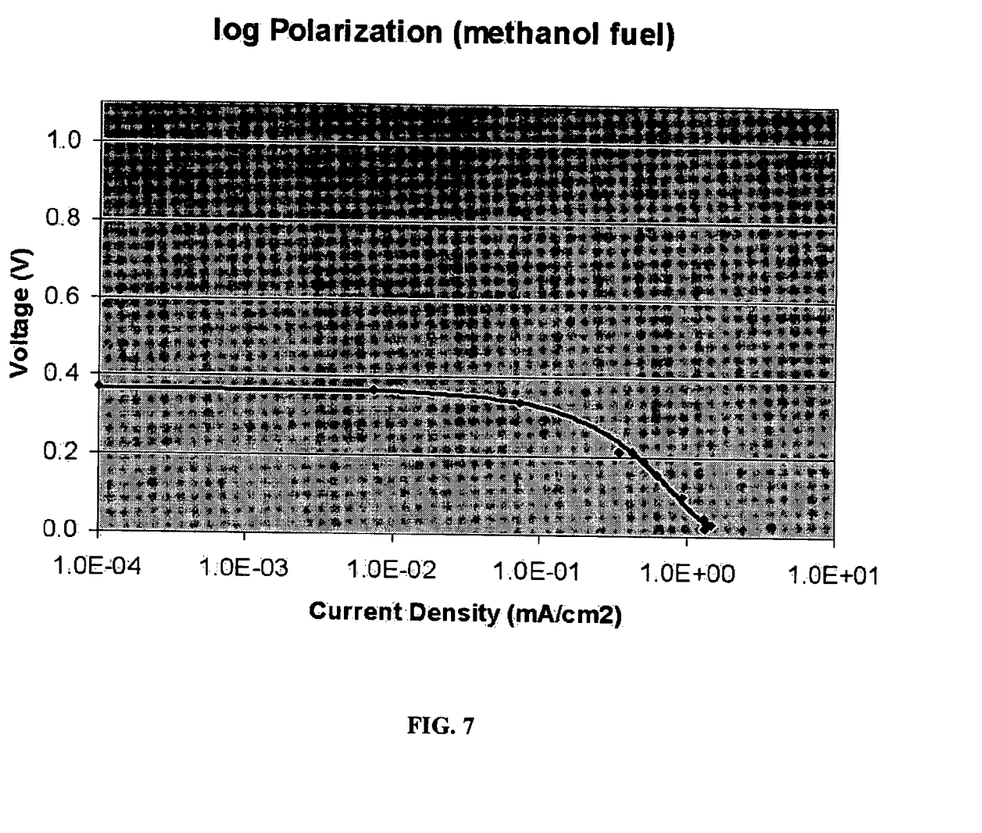
FIG. 7 is a fitted polarization curve for a 50 cm$^2$ area fuel cell of the present invention having an iron phthalocyanine cathode electrocatalyst, when running 1M methanol in 0.1M sodium hydroxide as the fuel, and 3M hydrogen peroxide as the oxidant, with a flow rate for each stream of 8 m/min.
Figure 8:
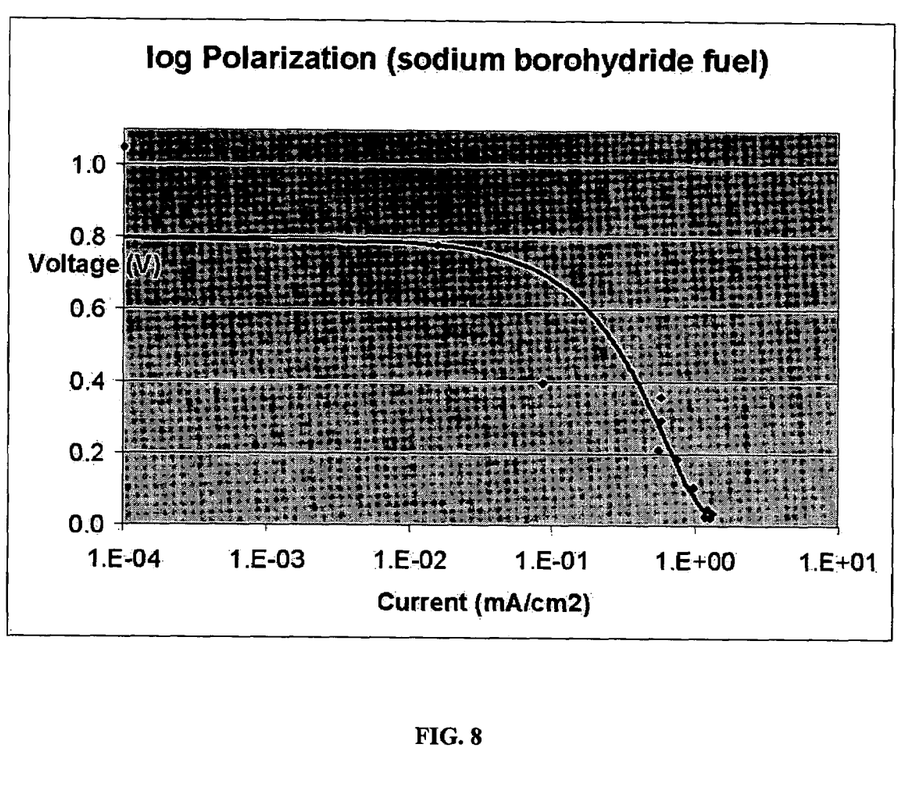
FIG. 8 is a fitted polarization curve for a 50 cm$^2$ area fuel cell of the present invention having an iron phthalocyanine cathode electrocatalyst, when running 0.1M sodium borohydride in 0.1M sodium hydroxide as the fuel, and 0.4M hydrogen peroxide as the oxidant, with a flow rate for each stream of 8 ml/min.

With regards to the fuel, water saturated hydrogen, as illustrated in FIG. 3, may be used. However, methanol in water, sodium borohydride in water, hydroxylamine in water, and their analogues and combinations, as illustrated in FIGS. 4-5, and 7-8, are preferred. For example, the direct liquid hydrogen peroxide fuel cell of the present invention may be run on methanol/water and sodium borohydride/water fuel compositions.

In contrast to the fuel cell of the present invention, the '281 fuel cell does not have a cathode coated with a metallic phthalocyanine electrocatalyst for directly reducing hydrogen peroxide, wherein the electrocatalyst is reactive with hydrogen peroxide in an electrochemical system under current flow, and unreactive with hydrogen peroxide under direct contact conditions without current flow. Further, if the '281 fuel cell were to directly reduce hydrogen peroxide at the cathode using, for example, microperoxidase-11 as the electrocatalyst, the microperoxidase-11 would denature (oxidize) under high hydrogen peroxide concentrations. Thus, for applications requiring the use of high concentration hydrogen peroxide (such as in applications in which small fuel cell system size is desired), the '281 fuel cell is impractical.

TEST EXAMPLE I

A cathode electrocatalyst membrane was prepared containing iron phthalocyanine, and an anode electrocatalyst membrane containing platinum/ruthenium for the anode. A fuel cell was then constructed using these cathode electrocatalyst membranes and anode electrocatalyst membranes, as shown in FIG. 1. Fuel I was then prepared by mixing 10.0% methanol in water by weight, and Oxidant I prepared by mixing as 10.4% hydrogen peroxide in water. The fuel cell was then run on the Fuel I and Oxidant I for 10 minutes, and the voltage measured continuously. The results of the measured voltage generated by the fuel cell using Fuel I and Oxidant I are shown FIG. 9.

Figure 9:
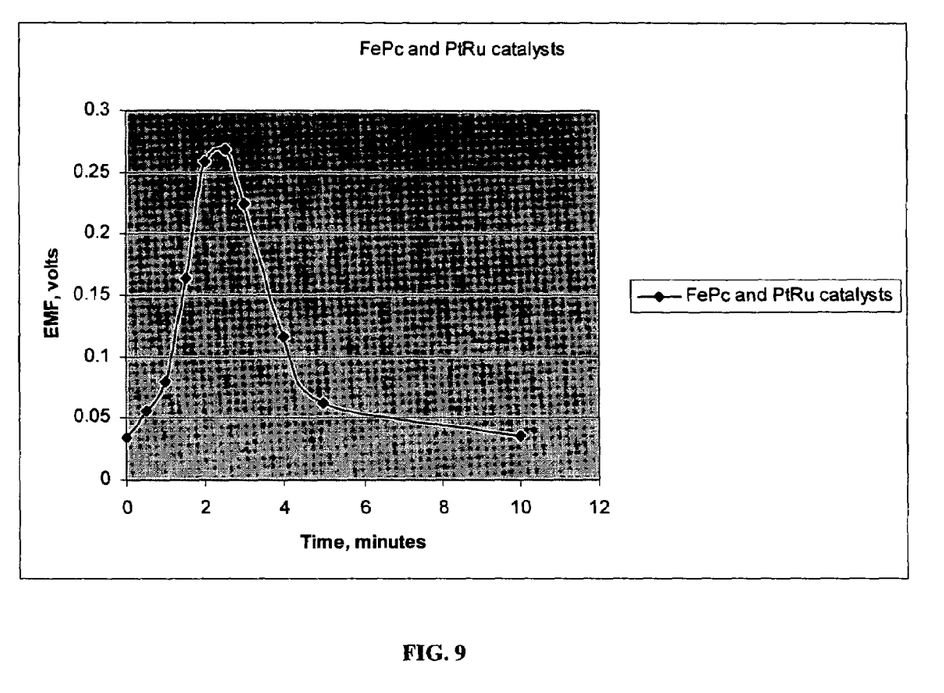
FIG. 9 is a graph illustrating the results of the measured voltage generated by the fuel cell of the present invention over time using Fuel I and Oxidant I, as described in Test Example I.

As illustrated in FIG. 9, initial no-load voltage was very good, and then dropped rapidly after 3-4 minutes. The oxidizer effluent was tinted light brown, apparently losing some material. A final effluent concentration of fuel of 9.5%, and oxidizer concentration of 10.0%, was measured. The fuel cell was run for an additional 1 hour and 50 minutes. Effectively, 6.4 g of $H_2O_2$, and 8 g of methanol, were consumed during 2 hours of operation.

COMPARATIVE TEST EXAMPLE II

A conventional cathode electrocatalyst membrane comprised of platinum/ruthenium, and a conventional anode electrocatalyst membrane comprised of platinum/ruthenium, was prepared. Fuel II was then prepared by mixing 9.5% methanol in water by weight, and Oxidant II prepared by mixing as 10.0% hydrogen peroxide in water by weight. The fuel cell was then run on the Fuel II and Oxidant II for 2 hours and 10 minutes, and the voltage measured continuously. The results of the measured voltage generated by the fuel cell using Fuel II and Oxidant II are shown in FIG. 10.

Figure 10:
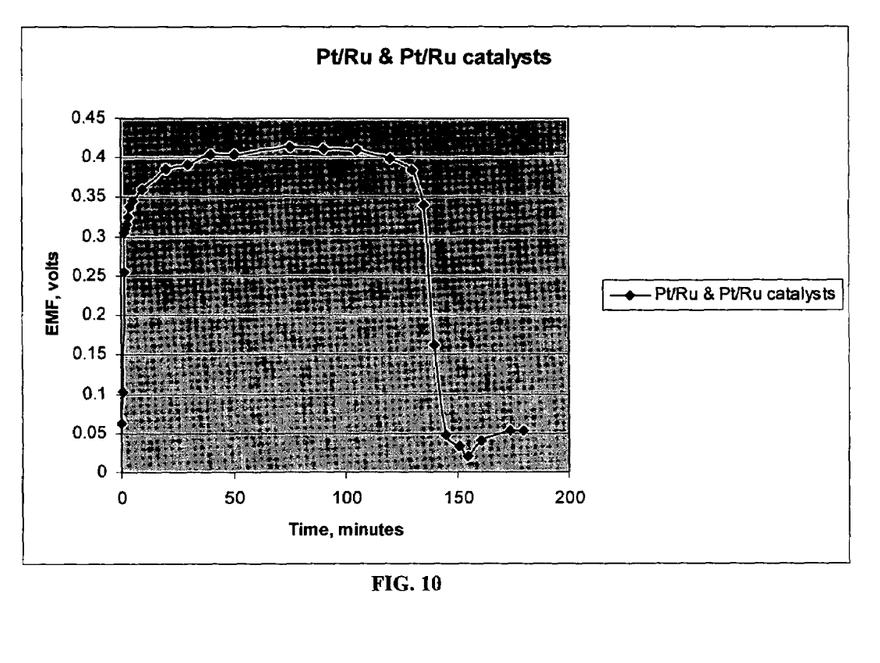
FIG. 10 is a graph illustrating the results of the measured voltage generated by a conventional fuel cell over time using Fuel II and Oxidant II, as described in Comparative Test Example I.

As illustrated in FIG. 10, the no-load voltage was good. A final effluent concentration of fuel of 9.0%, and oxidizer of 3.3% was measured. However, unlike in the fuel cell in Test Example 1 above, significant heat generation on the cathode side was observed. Moreover, 107.2 g of $H_2O_2$, and 8 g of methanol, were consumed, illustrating that use of conventional catalysts necessitate significantly larger quantities of oxidant (i.e., it is necessary to "overdose" the fuel and oxidizer sides with higher replenishing flow rates to make up the energy lost to heat production) to produce the same effective energy as the electrocatalyst of the present invention. The cathode catalyst was also an effective decomposition catalyst, hence very low fuel cell efficiency was observed.

What is claimed is:

1. A direct liquid-liquid fuel cell using a proton-donating fuel, comprising:
    a first compartment containing a proton-donating liquid fuel and having a first end with at least one input orifice and at least one output orifice disposed therein, and a second open end;
    an anode disposed adjacent to and in contact with the second open end of the first compartment, said anode comprising a porous and electrically conductive substrate having an ion-conducting polymer impregnated therein comprising a perfluorinated polymer containing sulfonic or carboxylic ionic functional groups, said anode being coated with a metal phthalocyanine electrocatalyst;
    a proton-conducting membrane disposed adjacent to and in contact with the anode;
    a cathode disposed adjacent to and in contact with the ion conducting membrane and electrically connected to the anode, said cathode comprising a conductive and porous substrate and a conductive, porous and inert binder of a polymer coated with a transition metal electrocatalyst comprising a metal phthalocyanine, said electrocatalyst being reactive with a proton accepting liquid in an electrochemical system under current flow, and unreactive with a proton accepting liquid under direct contact conditions without current flow; and
    a second compartment containing a proton-accepting liquid having a first end with at least one input orifice and at least one output orifice disposed therein, and a second open end disposed adjacent to and in contact with the cathode, said fuel cell having a supply of a proton-donating liquid flowably connected to an input orifice of the first compartment, for holding and supplying a proton-donating liquid to the first compartment, and a supply of a proton-accepting liquid flowably connected to the input orifice of the second compartment, for holding and supplying a proton-accepting liquid to the fuel cell.

2. The direct liquid-liquid fuel cell according to claim 1, wherein the cathode, anode, or both, further comprises a metal selected from the group consisting of ruthenium, rhodium, palladium, osmium, iridium and platinum, or a mixture thereof, to assist in catalyzing the reduction of the proton-accepting liquid or the oxidation of fuel, respectively.

3. The direct liquid-liquid fuel cell according to claim 1, wherein the proton-accepting liquid comprises hydrogen peroxide in water.

4. The direct liquid-liquid fuel cell according to claim 1, wherein the fuel cell further comprises a receiving reservoir flowably connected to the output orifice of the first compartment and a receiving reservoir flowably connected to the output orifice of the second compartment.

5. The direct liquid-liquid fuel cell according to claim 1, wherein the proton-donating fuel is comprised of:
    water saturated hydrogen, methanol in water, sodium borohydride in water, hydroxylamine in water, and their analogues and combinations.

6. The direct liquid-liquid fuel cell according to claim 1, wherein the porous and electrically conductive substrate forming the anode is selected from the group consisting of fritted carbon, carbon cloth, fitted metals, woven metals, and combinations thereof.

7. The direct liquid-liquid fuel cell according to claim 1, wherein the conductive binder of the cathode is comprised of a substituted synthetic zeolite, or a conducting polymer.

* * * * *